United States Patent
Fukasawa et al.

(10) Patent No.: US 11,942,874 B2
(45) Date of Patent: Mar. 26, 2024

(54) CONTROL SYSTEM OF POWER CONVERTER

(71) Applicant: TOSHIBA MITSUBISHI-ELECTRIC INDUSTRIAL SYSTEMS CORPORATION, Chuo-ku (JP)

(72) Inventors: Issei Fukasawa, Tokyo (JP); Masahiro Kinoshita, Tokyo (JP); Kenta Yamabe, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 184 days.

(21) Appl. No.: 17/754,651

(22) PCT Filed: Feb. 3, 2020

(86) PCT No.: PCT/JP2020/003983
§ 371 (c)(1),
(2) Date: Apr. 7, 2022

(87) PCT Pub. No.: WO2021/156923
PCT Pub. Date: Aug. 12, 2021

(65) Prior Publication Data
US 2023/0291328 A1    Sep. 14, 2023

(51) Int. Cl.
*H02M 7/493* (2007.01)
*H02M 7/537* (2006.01)

(52) U.S. Cl.
CPC ............ *H02M 7/493* (2013.01); *H02M 7/537* (2013.01)

(58) Field of Classification Search
CPC .............................. H02M 7/493; H02M 7/537
See application file for complete search history.

(56) References Cited

U.S. PATENT DOCUMENTS

| 11,533,013 | B1 * | 12/2022 | Schulz | ........................ | H02P 5/74 |
| 2017/0294852 | A1 * | 10/2017 | Correa Vasques | .. | H02M 7/5395 |
| 2018/0366943 | A1 * | 12/2018 | Matsuoka | ................. | H02J 3/46 |

FOREIGN PATENT DOCUMENTS

| JP | 3-103076 A | 4/1991 |
| JP | 4-289775 A | 10/1992 |
| JP | 2005-20947 A | 1/2005 |
| JP | 2019-24300 A | 2/2019 |

OTHER PUBLICATIONS

Indian Office Action dated Sep. 8, 2022 in Indian Patent Application No. 202217019994, 6 pages.
International Search Report and Written Opinion dated Mar. 10, 2020 in PCT/JP2020/003983 filed on Feb. 3, 2020 (12 pages).
International Preliminary Report on Patentability and Written Opinion dated Aug. 18, 2022 in PCT/JP2020/003983 (submitting English translation only), 6 pages.

\* cited by examiner

*Primary Examiner* — Gary A Nash
(74) *Attorney, Agent, or Firm* — Oblon, McClelland, Maier & Neustadt, L.L.P.

(57) ABSTRACT

A control system of a power converter includes a plurality of carrier wave generating units which are respectively provided for a plurality of power converters connected between a plurality of DC power supplies and a common AC power supply and which are configured to respectively generate carrier waves on the basis of an AC voltage of the AC power supply. The control system of the power converter can thereby synchronize carrier phases of a plurality of power converters.

3 Claims, 5 Drawing Sheets

CONTROL SYSTEM OF POWER CONVERTER

FIELD

The present invention relates to a control system of a power converter.

BACKGROUND

PTL 1 discloses a power conversion system. This power conversion system is capable of synchronizing carrier phases of a plurality of power converters.

CITATION LIST

Patent Literature

[PTL 1] JP 2019-24300 A

SUMMARY

Technical Problem

However, in the power conversion system disclosed in PTL 1, a plurality of control apparatuses which respectively control the plurality of power converters need to communicate synchronization signals with each other, which makes a configuration of the power conversion system complicated.

An object of the present invention, which has been made to solve the above-described problem, is to provide a control system of a power converter which is capable of synchronizing carrier phases of a plurality of power converters with a simpler configuration.

Solution to Problem

A control system of a power converter according to the present invention includes a plurality of carrier wave generating units respectively provided for a plurality of power converters connected between a plurality of DC power supplies and a common AC power supply, the plurality of carrier wave generating units being configured to respectively generate carrier waves on the basis of an AC voltage of the AC power supply.

Advantageous Effects of Invention

According to the present invention, carrier waves are respectively generated at a plurality of power converters on the basis of an AC voltage of a common AC power supply, so that it is possible to synchronize carrier phases of the plurality of power converters with a simpler configuration.

DESCRIPTION OF EMBODIMENTS

Embodiments for implementing the present invention will be described in accordance with the accompanying drawings. Note that the same reference numerals will be assigned to portions which are identical or equivalent in respective drawings. Repetitive descriptions of the portions will be simplified or omitted as appropriate.

Embodiment 1

Figure 1:
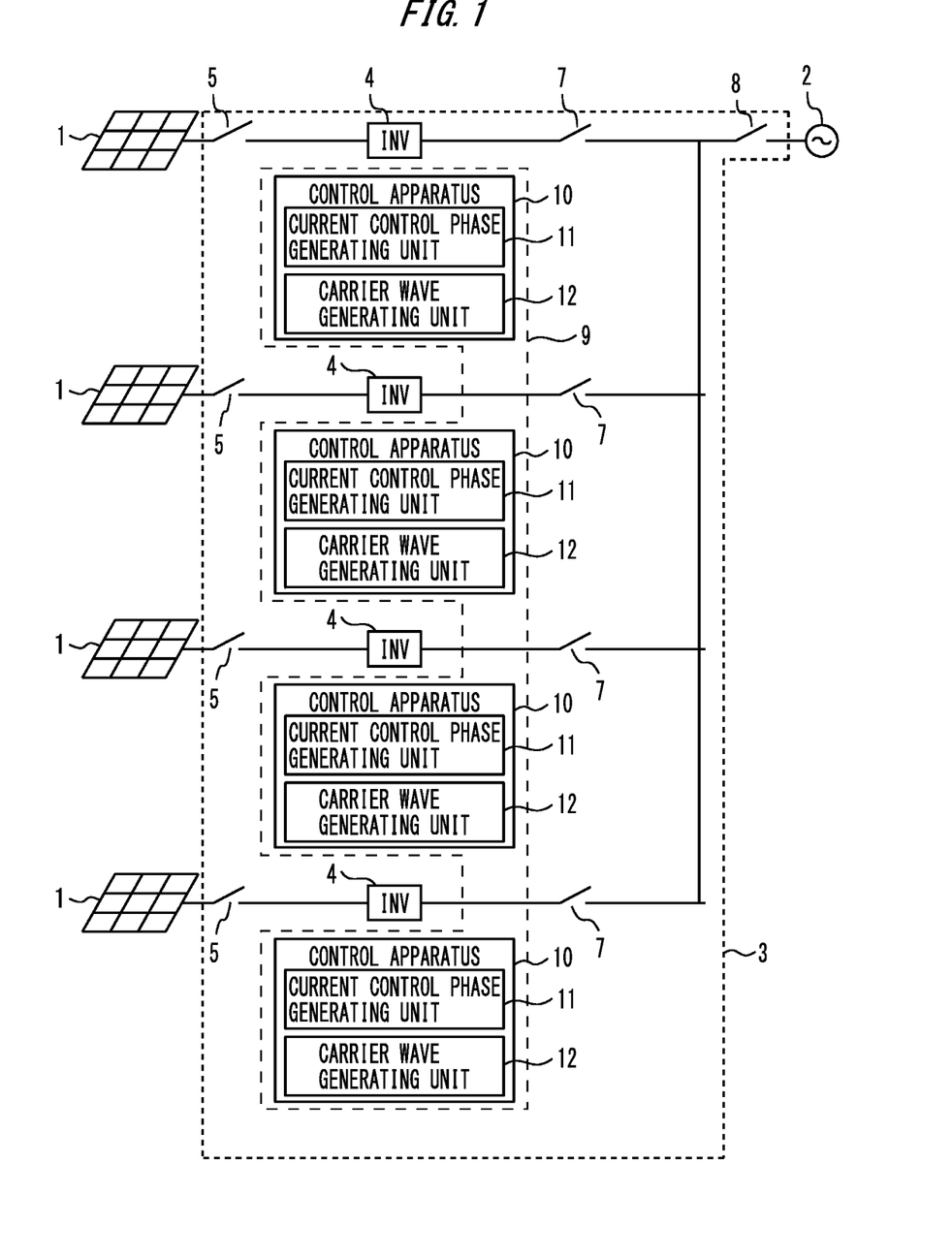
FIG. 1 is a configuration diagram of an electric system to which a control system of a power converter in Embodiment 1 is applied.

FIG. 1 is a configuration diagram of an electric system to which a control system of a power converter in Embodiment 1 is applied.

In the electric system in FIG. 1, a plurality of DC power supplies 1 are provided outdoors. For example, the DC power supply 1 is a solar cell. FIG. 1 illustrates four DC power supplies 1. An AC power supply 2 is operated by an electric power utility company, or the like. A distributed power supply conversion system 3 is connected between the plurality of DC power supplies 1 and the AC power supply 2.

The distributed power supply conversion system 3 includes a plurality of power converters 4, a plurality of DC side switches 5, a plurality of AC side switches 7, an AC power supply side switch 8 and a control system 9.

Respective input units of the plurality of power converters 4 are connected to respective output units of the plurality of DC power supplies 1. Each of the plurality of power converters 4 is provided so as to be able to convert DC power from each of the plurality of DC power supplies 1 into AC power.

Each of the plurality of DC side switches 5 is connected between each of the plurality of DC power supplies 1 and each of the plurality of power converters 4. Each of the plurality of DC side switches 5 is provided so as to be able to interrupt connection between each of the plurality of DC power supplies 1 and each of the plurality of power converters 4 when an overcurrent occurs between each of the plurality of DC power supplies 1 and each of the plurality of power converters 4.

Each of the plurality of AC side switches 7 is connected between each of the plurality of power converters 4 and the AC power supply 2. Each of the plurality of AC side switches 7 is provided so as to be able to interrupt connection between each of the plurality of power converters 4 and each of a plurality of transformers 6 when an overcurrent occurs on respective AC sides of the plurality of power converters 4.

The AC power supply side switch 8 is provided between the plurality of AC side switches 7 and the AC power supply 2. The AC power supply side switch 8 is provided so as to be able to interrupt connection between the plurality of AC side switches 7 and the AC power supply 2 when an overcurrent occurs between the plurality of AC side switches 7 and the AC power supply 2.

The control system 9 includes a plurality of control apparatuses 10. The plurality of control apparatuses 10 are respectively provided at the plurality of power converters 4. Each of the plurality of control apparatuses 10 includes a current control phase generating unit 11 and a carrier wave generating unit 12.

Each current control phase generating unit 11 generates a calculation result of an AC voltage phase for current control for the corresponding power converter 4 on the basis of an AC voltage of the AC power supply 2. For example, each current control phase generating unit 11 generates a calculation result of an AC voltage phase for current control for the corresponding power converter 4 after calculating a d-axis voltage and a q-axis voltage on the basis of a U-phase voltage, a V-phase voltage and a W-phase voltage of the AC power supply 2.

The carrier wave generating unit 12 generates a calculation result of an AC voltage phase for generating a carrier wave for the corresponding power converter 4 on the basis of the AC voltage of the AC power supply 2 separately from the current control phase generating unit 11. The carrier wave generating unit 12 generates a carrier wave on the basis of the calculation result of the AC voltage phase. For example, each carrier wave generating unit 12 generates a calculation result of the AC voltage phase for generating a carrier wave for the corresponding power converter 4 after calculating the d-axis voltage and the q-axis voltage on the basis of the U-phase voltage, the V-phase voltage and the W-phase voltage of the AC power supply 2. The carrier wave generating unit 12 generates a carrier wave so that a phase of the carrier wave is in synchronization with the calculation result of the AC voltage phase for generating a carrier wave.

An example of a method for generating a carrier wave will be described next using FIG. 2.

Figure 2:
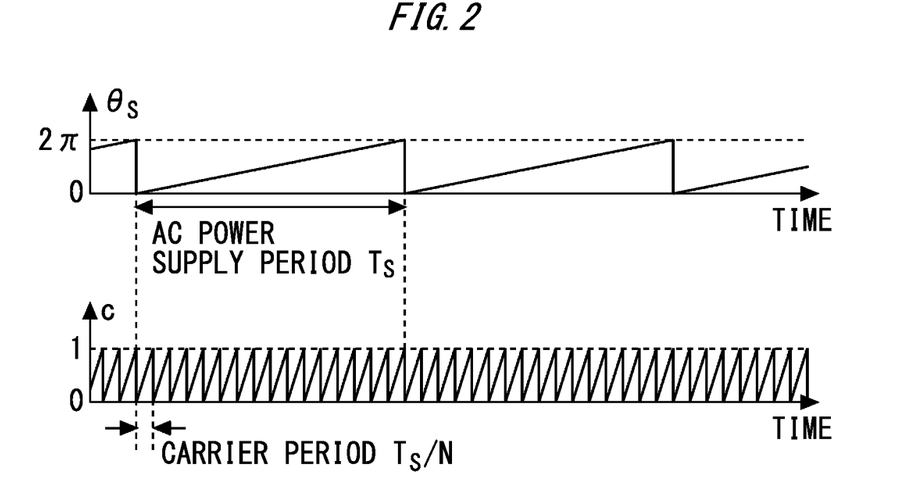
FIG. 2 is a view for explaining an example of a method for generating a carrier wave by the control system of the power converter in Embodiment 1.

FIG. 2 is a view for explaining an example of a method for generating a carrier wave by the control system of the power converter in Embodiment 1.

In FIG. 2, $\theta_S$ is a calculation result of the AC voltage phase for generating a carrier wave. $\theta_S$ is a periodic signal which changes between 0 and $2\pi$ over time in a sawtooth waveform during an AC power supply period $T_S$. A carrier wave c is calculated using the following expression (1).

$$c = \mathrm{mod}(N\theta_S/(2\pi), 1) \quad (1)$$

Here, N is a natural number. mod $(N\theta_S/(2\pi), 1)$ represents a remainder obtained by dividing $N\theta_S/(2\pi)$ by 1. mod $(N\theta_S/(2\pi), 1)$ satisfies the following expression (2).

$$0 \leq \mathrm{mod}(N\theta_S/(2\pi), 1) < 1 \quad (2)$$

In this event, c becomes a sawtooth wave which changes between 0 and 1 over time. A period of c is 1/N of a period of an AC voltage. Further, c=0 in a phase in which $\theta_S$=0. In other words, a phase of c is in synchronization with the phase of the AC voltage. While a method for generating a carrier wave in which the phase of c is in synchronization with the phase of the AC voltage, and c becomes a sawtooth wave whose period is 1/N, has been described here, c may be calculated so as to be a triangle wave whose phase is in synchronization with the phase of the AC voltage and whose period is 1/N.

Outline of the power converter 4 will be described next using FIG. 3.

Figure 3:
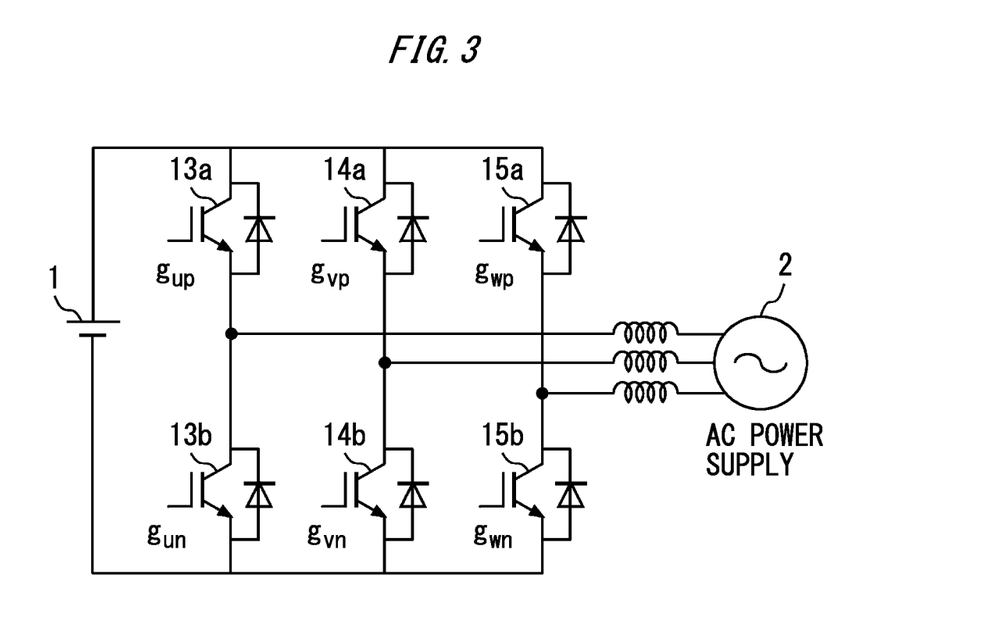
FIG. 3 is a configuration diagram of a power converter to which the control system of the power converter in Embodiment 1 is applied.

FIG. 3 is a configuration diagram of a power converter to which the control system of the power converter in Embodiment 1 is applied.

As illustrated in FIG. 3, the power converter 4 includes a U-phase upper switching element 13a, a U-phase lower switching element 13b, a V-phase upper switching element 14a, a V-phase lower switching element 14b, a W-phase upper switching element 15a and a W-phase lower switching element 15b.

The U-phase upper switching element 13a performs switching operation on the basis of a gate signal $g_{up}$. The U-phase lower switching element 13b performs switching operation on the basis of a gate signal $g_{un}$. The V-phase upper switching element 14a performs switching operation on the basis of a gate signal $g_{vp}$. The V-phase lower switching element 14b performs switching operation on the basis of a gate signal $g_{vn}$. The W-phase upper switching element 15a performs switching operation on the basis of a gate signal $g_{wp}$. The W-phase lower switching element 15b performs switching operation on the basis of a gate signal $g_{wn}$.

A method for generating a gate signal will be described next using FIG. 4.

Figure 4:
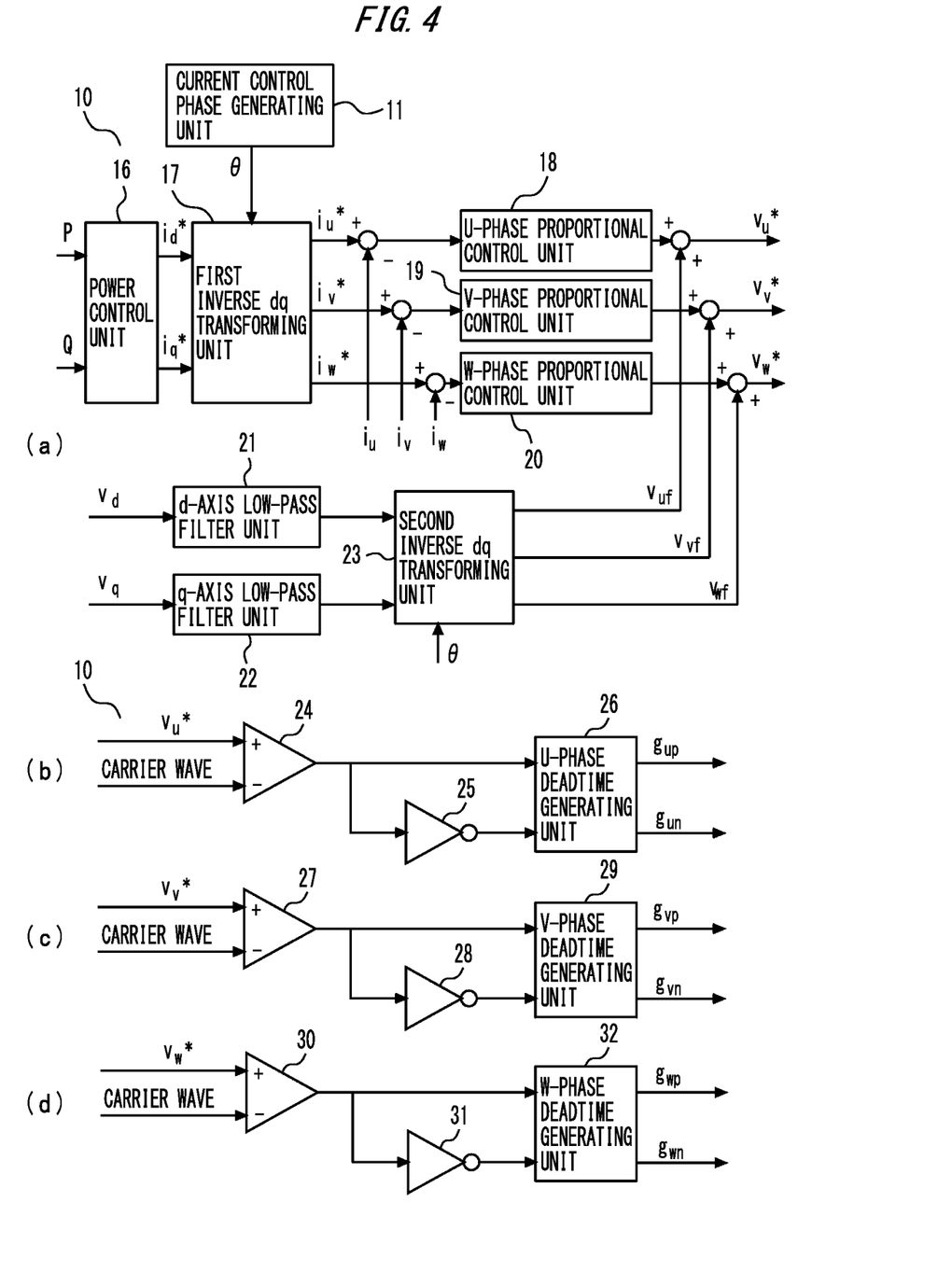
FIG. 4 is a configuration diagram of a control apparatus to which the control system of the power converter in Embodiment 1 is applied.

FIG. 4 is a configuration diagram of a control apparatus to which the control system of the power converter in Embodiment 1 is applied.

As illustrated in (a) of FIG. 4, the control apparatus 10 includes a power control unit 16, a first inverse dq transforming unit 17, a U-phase proportional control unit 18, a V-phase proportional control unit 19, a W-phase proportional control unit 20, a d-axis low-pass filter unit 21, a q-axis low-pass filter unit 22, and a second inverse dq transforming unit 23.

The power control unit 16 calculates a d-axis current command value $i_d^*$ and a q-axis current command value $q_d^*$ on the basis of active power P and reactive power Q of the AC power supply 2. The first inverse dq transforming unit 17 calculates a U-phase current command value $i_u^*$, a V-phase current command value $i_v^*$ and a W current command value $i_w^*$ on the basis of the d-axis current command value $i_d^*$ and the q-axis current command value $i_q^*$ from the power control unit 16, and a phase $\theta$ for current control from the current control phase generating unit 11.

The U-phase proportional control unit 18 performs proportional control on a deviation between the U-phase current command value $i_u^*$ from the first inverse dq transforming unit 17 and a U-phase current actual value $i_u$ of the AC power supply 2. The V-phase proportional control unit 19 performs proportional control on a deviation between the V-phase current command value $i_v^*$ from the first inverse dq transforming unit 17 and a V-phase current actual value $i_v$ of the AC power supply 2. The W-phase proportional control unit 20 performs proportional control on a deviation between the W-phase current command value $i_w^*$ from the first inverse dq transforming unit 17 and a W-phase current actual value $i_w$ of the AC power supply 2.

The d-axis low-pass filter unit 21 applies a low-pass filter to a d-axis voltage actual value $V_d$ of the AC power supply 2. The q-axis low-pass filter unit 22 applies a low-pass filter to a q-axis voltage actual value $V_q$ of the AC power supply 2.

The second inverse dq transforming unit 23 calculates a U-phase voltage reference value $v_{uf}$, a V-phase voltage reference value $v_{vf}$ and a W-phase voltage reference value $v_{wf}$ on the basis of the d-axis voltage actual value from the d-axis low-pass filter unit 21, the q-axis voltage actual value from the q-axis low-pass filter unit 22, and the phase $\theta$ for current control from the current control phase generating unit 11.

The U-phase voltage command value $v_u^*$ is generated by adding the U-phase voltage reference value $v_{uf}$ from the second inverse dq inverse transforming unit and an output value of the U-phase proportional control unit 18. The V-phase voltage command value $v_v^*$ is generated by adding the V-phase voltage reference value $v_{vf}$ from the second inverse dq inverse transforming unit and an output value of the V-phase proportional control unit 19. The W-phase voltage command value $v_w^*$ is generated by adding the W-phase voltage reference value $v_{wf}$ from the second inverse dq inverse transforming unit and an output value of the W-phase proportional control unit 20.

As illustrated in (b) in FIG. 4, the control apparatus 10 includes a U-phase comparing unit 24, a U-phase logical negating unit 25, and a U-phase deadtime generating unit 26.

The U-phase comparing unit 24 compares the U-phase voltage command value $v_u^*$ with a value of a carrier wave based on the carrier phase generated by the carrier wave generating unit 12. The U-phase logical negating unit 25 inverts the comparison result of the U-phase comparing unit 24. The U-phase deadtime generating unit 26 outputs a gate signal $g_{up}$ in a case where the U-phase voltage command value $v_u^*$ is greater than the value of the carrier wave. The U-phase deadtime generating unit 26 outputs a gate signal $g_{un}$ in a case where the U-phase voltage command value $v_u^*$ is smaller than the value of the carrier wave. In this event, the U-phase deadtime generating unit 26 provides a deadtime for switching output between output of the gate signal $g_{up}$ and output of the gate signal $g_{un}$.

As illustrated in (c) of FIG. 4, the control apparatus 10 includes a V-phase comparing unit 27, a V-phase logical negating unit 28, and a V-phase deadtime generating unit 29.

The V-phase comparing unit 27 compares the V-phase voltage command value $v_v^*$ with the value of the carrier wave based on the carrier phase generated by the carrier wave generating unit 12. The V-phase logical negating unit 28 inverts the comparison result of the V-phase comparing unit 27. The V-phase deadtime generating unit 29 outputs a gate signal $g_{vp}$ in a case where the V-phase voltage command value $v_v^*$ is greater than the value of the carrier wave. The V-phase deadtime generating unit 29 outputs a gate signal $g_{vn}$ in a case where the V-phase voltage command value $v_v^*$ is smaller than the value of the carrier wave. In this event, the V-phase deadtime generating unit 29 provides a deadtime for switching output between output of the gate signal $g_{vp}$ and output of the gate signal $g_{vn}$.

As illustrated in (d) of FIG. 4, the control apparatus 10 includes a W-phase comparing unit 30, a W-phase logical negating unit 31, and a W-phase deadtime generating unit 32.

The W-phase comparing unit 30 compares the W-phase voltage command value $v_w^*$ with the value of the carrier wave based on the carrier phase generated by the carrier wave generating unit 12. The W-phase logical negating unit 31 inverts the comparison result of the W-phase comparing unit 30. The W-phase deadtime generating unit 32 outputs a gate signal $g_{wp}$ in a case where the W-phase voltage command value $v_w^*$ is greater than the value of the carrier wave. The W-phase deadtime generating unit 32 outputs a gate signal $g_{wn}$ in a case where the W-phase voltage command value $v_w^*$ is smaller than the value of the carrier wave. In this event, the W-phase deadtime generating unit 32 provides a deadtime for switching output between output of the gate signal $g_{wp}$ and output of the gate signal $g_{wn}$.

A main part of the control apparatus 10 will be described next using FIG. 5.

Figure 5:
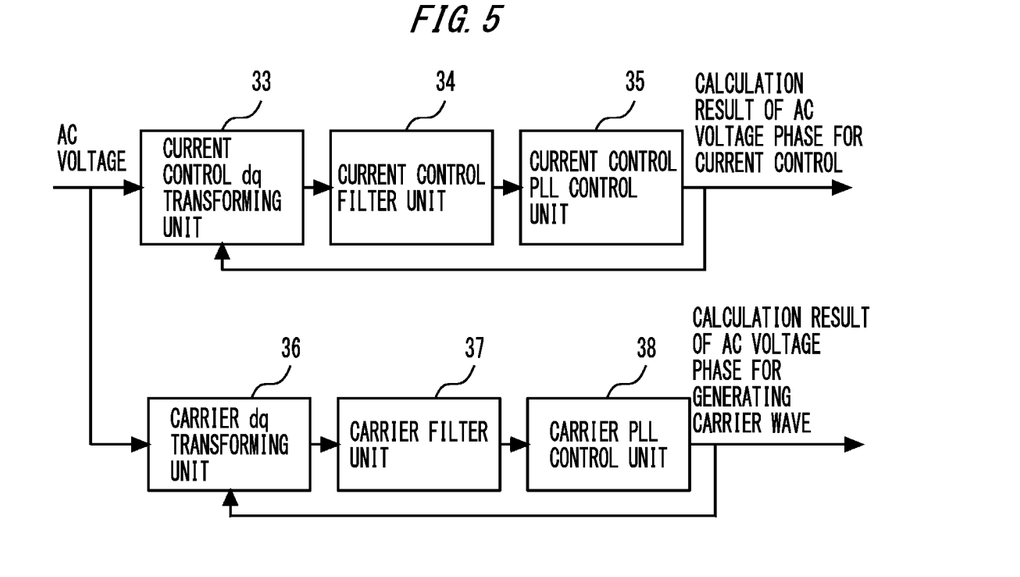
FIG. 5 is a conceptual diagram of a main part of the control apparatus to which the control system of the power converter in Embodiment 1 is applied.

FIG. 5 is a conceptual diagram of the main part of the control apparatus to which the control system of the power converter in Embodiment 1 is applied.

At the control apparatus 10 in FIG. 5, the current control phase generating unit 11 includes a current control dq transforming unit 33, a current control filter unit 34, and a current control PLL control unit 35.

The current control dq transforming unit 33 dq-transforms the AC voltage of the AC power supply 2. The current control filter unit 34 applies a filter to the AC voltage which is dq-transformed by the current control dq transforming unit 33. The current control PLL control unit 35 generates a phase for current control on the basis of the AC voltage to which the filter is applied by the current control filter unit 34. The phase for current control is fed back to the dq transforming unit.

At the control apparatus 10 in FIG. 5, the carrier wave generating unit 12 includes a carrier dq transforming unit 36, a carrier filter unit 37, and a carrier PLL control unit 38.

The carrier dq transforming unit 36 dq-transforms the AC voltage of the AC power supply 2. The carrier filter unit 37 applies a filter to the AC voltage which is dq-transformed by the carrier dq transforming unit 36. The carrier PLL control unit 38 generates a calculation result of the AC voltage phase for a carrier on the basis of the AC voltage to which the filter is applied by the carrier filter unit 37. The calculation result of the AC voltage phase for a carrier is fed back to the dq transforming unit.

According to Embodiment 1 described above, carrier waves are respectively generated at a plurality of power converters 4 on the basis of the AC voltage of the common AC power supply 2. Phases of the respective carrier waves are in synchronization with the phase of the common AC voltage. As a result, the phases of the respective carrier waves are in synchronization with each other. This synchronization does not require communication between the control apparatuses corresponding to the respective power converters 4. It is therefore possible to synchronize carrier phases of the plurality of power converters 4 with a simpler and inexpensive configuration, so that it is eventually possible to prevent overflowing among the plurality of power converters 4.

Note that it is only necessary to generate a calculation result of the AC voltage phase for generating a carrier wave after applying a slower filter to the AC voltage of the AC power supply 2. In this case, it is possible to minimize influence of a phase, a frequency, amplitude change, or the like, of the AC power supply 2. As a result, even if a transient difference occurs in observation results of the AC voltage of the AC power supply 2 among the plurality of power converters 4 due to disturbance, or the like, of the AC power supply 2, it is possible to keep synchronization of the carrier phases for the plurality of power converters 4. Further, even if a frequency, a voltage, or the like, of the AC power supply 2 temporarily fluctuates, it is possible to generate a carrier wave which is stable during a certain period of time.

In contrast, it is only necessary to generate a calculation result of the AC voltage phase for current control after applying a faster filter to the AC voltage of the AC power supply 2. For example, it is only necessary to generate a calculation result of the AC voltage phase for current control after applying a filter faster than the filter for generating a calculation result of the AC voltage phase for generating a carrier wave, to the AC voltage of the AC power supply 2. In this case, it is possible to achieve more favorable current control, so that it is eventually possible to follow change of a phase, a frequency, and the like, of the AC power supply 2 quickly.

An example of the control apparatus 10 will be described next using FIG. 6.

Figure 6:
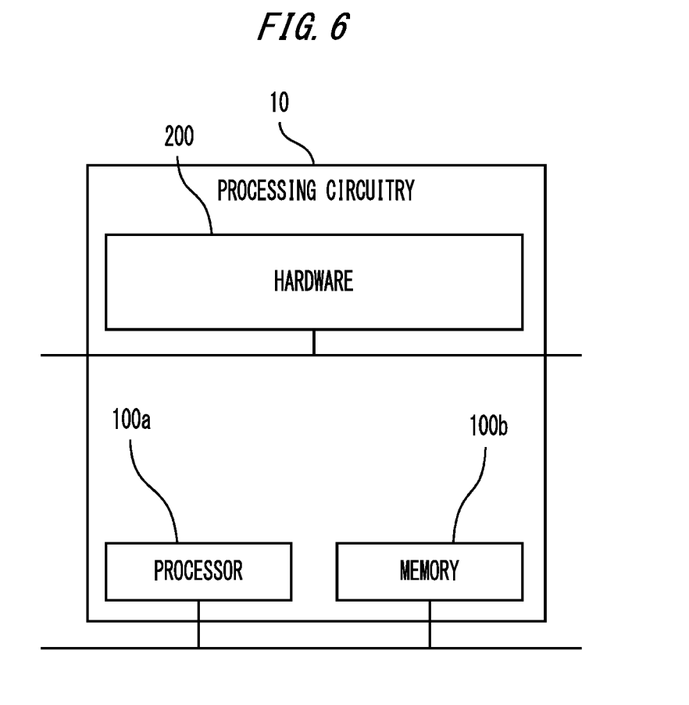
FIG. 6 is a hardware configuration diagram of the control apparatus to which the control system of the power converter in Embodiment 1 is applied.

FIG. 6 is a hardware configuration diagram of the control apparatus to which the control system of the power converter in Embodiment 1 is applied.

Respective functions of the control apparatus 10 can be implemented with a processing circuitry. For example, the processing circuitry includes at least one processor 100*a* and at least one memory 100*b*. For example, the processing circuitry includes at least one dedicated hardware 200.

In a case where the processing circuitry includes at least one processor 100*a* and at least one memory 100*b*, respective functions of the control apparatus 10 are implemented with software, firmware or combination of the software and the firmware. At least one of the software and the firmware is described as a program. At least one of the software and the firmware is stored in at least one memory 100*b*. At least one processor 100*a* implements respective functions of the control apparatus 10 by reading out and executing a program stored in at least one memory 100*b*. At least one processor 100*a* is also referred to as a central processing unit, a processing apparatus, an arithmetic apparatus, a microprocessor, a microcomputer, or a DSP. For example, at least one memory 100*b* is a non-volatile or volatile semiconductor memory such as a RAM, a ROM, a flash memory, an EPROM and an EEPROM, a magnetic disk, a flexible disk, an optical disk, a compact disk, a mini disk, a DVD, or the like.

In a case where the processing circuitry includes at least one dedicated hardware 200, the processing circuitry is implemented with, for example, a single circuit, a complex circuit, a programmed processor, a parallelly programmed processor, an ASIC, an FPGA or combination thereof. For example, respective functions of the control apparatus 10 are respectively implemented at the processing circuitry. For example, the respective functions of the control apparatus 10 are collectively implemented at the processing circuitry.

Part of the respective functions of the control apparatus 10 may be implemented at the dedicated hardware 200, and the remaining part may be implemented at software or firmware. For example, functions of the current control phase generating unit 11 may be implemented at the processing circuitry as the dedicated hardware 200, and functions other than the functions of the current control phase generating unit 11 may be implemented by at least one processor 100*a* reading out and executing the program stored in at least one memory 100*b*.

In this manner, the processing circuitry implements the respective functions of the control apparatus 10 by the hardware 200, the software, the firmware or combination thereof.

Embodiment 2

Figure 7:
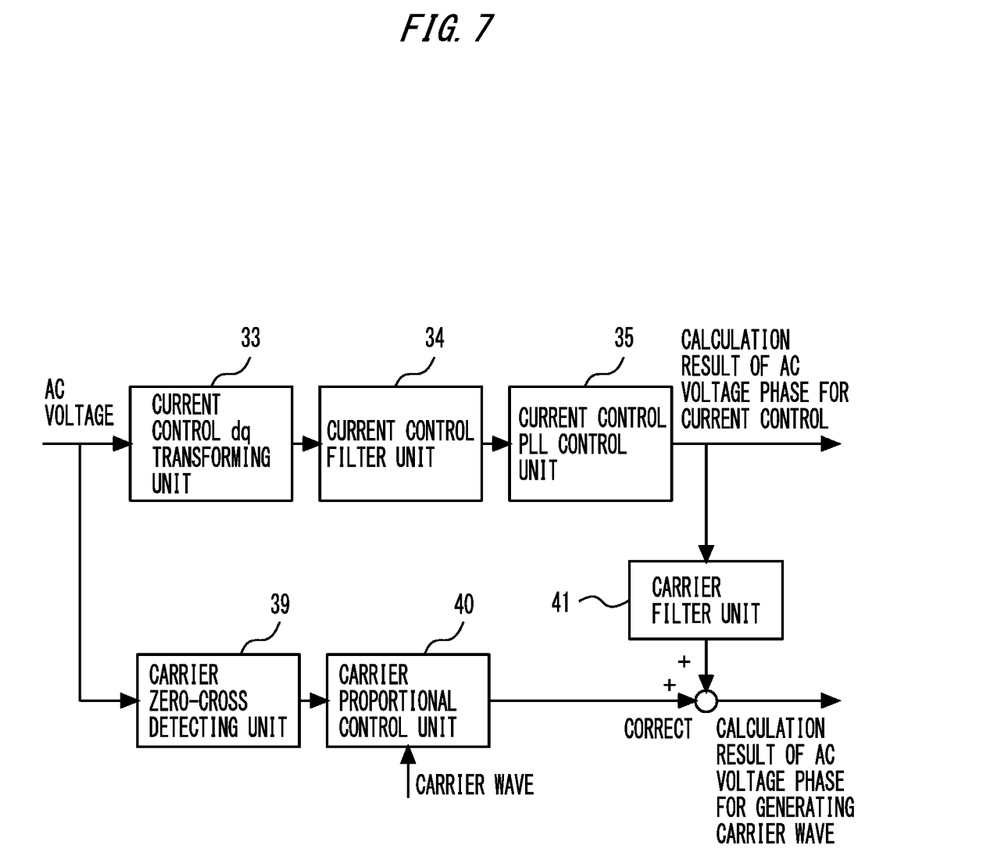
FIG. 7 is a conceptual diagram of a main part of a control apparatus to which a control system of a power converter in Embodiment 2 is applied.

FIG. 7 is a conceptual diagram of a main part of a control apparatus to which a control system of a power converter in Embodiment 2 is applied. Note that the same reference numerals will be assigned to portions which are identical with or correspond to portions in Embodiment 1. Description of the portions will be omitted.

At the control apparatus 10 in Embodiment 2, the carrier wave generating unit 12 generates a calculation result of the AC voltage phase for generating a carrier wave by correcting the phase for current control generated by the current control phase generating unit 11.

The carrier wave generating unit 12 includes a carrier zero-cross detecting unit 39, a carrier proportional control unit 40, and a carrier filter unit 41.

The carrier zero-cross detecting unit 39 detects a zero-cross point at the AC voltage of the AC power supply 2. The carrier proportional control unit 40 calculates a correction amount of the carrier phase on the basis of the detection result of the zero-cross point by the carrier zero-cross detecting unit 39 and the carrier wave. The carrier filter unit 41 applies a filter to the calculation result of the AC voltage phase for current control generated by the current control PLL control unit 35. The calculation result of the AC voltage phase for generating a carrier wave is generated by adding the correction amount from the carrier proportional control unit 40 to the calculation result of the AC voltage phase to which the filter is applied by the carrier filter unit.

According to Embodiment 2 described above, the carrier wave generating unit 12 generates a carrier phase by correcting the phase for current control generated by the current control phase generating unit 11. It is therefore possible to synchronize carrier phases of the plurality of power converters 4 with a simpler and inexpensive configuration in a similar manner to Embodiment 1, so that it is eventually possible to prevent overflowing among the plurality of power converters 4.

INDUSTRIAL APPLICABILITY

As described above, the control system of the power converter according to the present invention can be utilized in an electric system.

REFERENCE SIGNS LIST

1 DC power supply
2 AC power supply
3 Distributed power supply conversion system
4 Power converter
5 DC side switch
6 Transformer
7 AC side switch
8 AC power supply side switch
9 Control system
10 Control apparatus
11 Current control phase generating unit
12 Carrier wave generating unit
13*a* U-phase upper switching element
13*b* U-phase lower switching element
14*a* V-phase upper switching element
14*b* V-phase lower switching element
15*a* W-phase upper switching element
15*b* W-phase lower switching element
16 Power control unit
17 First inverse dq transforming unit
18 U-phase proportional control unit
19 V-phase proportional control unit
20 W-phase proportional control unit
21 d-axis low-pass filter unit
22 q-axis low-pass filter unit
23 Second inverse dq transforming unit
24 U-phase comparing unit
25 U-phase logical negating unit
26 U-phase deadtime generating unit
27 V-phase comparing unit
28 V-phase logical negating unit 29 V-phase deadtime generating unit
W-phase comparing unit
31 W-phase logical negating unit
32 W-phase deadtime generating unit
33 Current control dq transforming unit
34 Current control filter unit
Current control PLL control unit
36 Carrier dq transforming unit
37 Carrier filter unit
38 Carrier PLL control unit
39 Carrier zero-cross detecting unit
Carrier proportional control unit
41 Carrier filter unit
100a Processor
100b Memory
200 Hardware

The invention claimed is:

1. A control system of a power converter comprising:

a plurality of carrier wave generating units respectively provided for a plurality of power converters connected between a plurality of DC power supplies and a common AC power supply, the plurality of carrier wave generating units being configured to respectively generate carrier waves on a basis of an AC voltage of the AC power supply; and a plurality of current control phase generating units respectively provided for the plurality of power converters connected between the plurality of DC power supplies and the common AC power supply, the plurality of current control phase generating units being configured to respectively generate AC voltage phases for current control respectively for the plurality of power converters on a basis of the AC voltage of the AC power supply, wherein the plurality of current control phase generating units respectively generate AC voltage phases for current control respectively for the plurality of power converters after applying filters to the AC voltage of the AC power supply, and the plurality of carrier wave generating units respectively generate AC voltage phases for carriers respectively for the plurality of power converters after applying filters slower than the filters of the plurality of current control phase generating units, to the AC voltage of the AC power supply.

2. A control system of a power converter comprising:

a plurality of carrier wave generating units respectively provided for a plurality of power converters connected between a plurality of DC power supplies and a common AC power supply, the plurality of carrier wave generating units being configured to respectively generate carrier waves on a basis of an AC voltage of the AC power supply; and a plurality of current control phase generating units respectively provided for the plurality of power converters connected between the plurality of DC power supplies and the common AC power supply, the plurality of current control phase generating units being configured to respectively generate AC voltage phases for current control respectively for the plurality of power converters on a basis of the AC voltage of the AC power supply, wherein the plurality of carrier wave generating units respectively generate carrier waves on a basis of phases obtained by correcting phases for current control respectively generated by the plurality of current control phase generating units.

3. The control system of the power converter according to claim 2, wherein the plurality of current control phase generating units respectively generate AC voltage phases for current control respectively for the plurality of power converters after applying filters to the AC voltage of the AC power supply, and the plurality of carrier wave generating units respectively generate carrier waves respectively for the plurality of power converters on a basis of signals obtained by applying filters to the AC voltage phases for current control respectively generated by the plurality of current control phase generating units.

* * * * *